United States Patent [19]
Eum et al.

[11] Patent Number: 6,118,464
[45] Date of Patent: Sep. 12, 2000

[54] BEAM SCANNING APPARATUS FOR ELECTROPHOTOGRAPHIC COLOR PRINTER USING DEFLECTION DISK

[75] Inventors: Jae-yong Eum, Suwon; Sung-min cho, Seoul, both of Rep. of Korea

[73] Assignee: Samsung Electronics Co., Ltd., Kyungki-Do, Rep. of Korea

[21] Appl. No.: 09/099,407

[22] Filed: Jun. 18, 1998

[30] Foreign Application Priority Data

Feb. 16, 1998 [KR] Rep. of Korea .......................... 98-4613

[51] Int. Cl.⁷ .......................... G03G 15/01; G03G 15/04
[52] U.S. Cl. .............................. 347/118; 347/232; 359/18
[58] Field of Search ................................. 347/115, 118, 347/134, 232, 243; 359/18, 201, 204

[56] References Cited

U.S. PATENT DOCUMENTS

| | | | |
|---|---|---|---|
| 4,487,472 | 12/1984 | Asano | 359/18 |
| 4,761,046 | 8/1988 | Funato | 359/18 |
| 5,257,037 | 10/1993 | Haneda et al. | 347/118 |
| 6,018,409 | 1/2000 | Eum et al. | 359/204 |

*Primary Examiner*—Joan Pendegrass
*Attorney, Agent, or Firm*—Sughrue, Mion, Zinn, Macpeak & Seas, PLLC

[57] ABSTRACT

In a beam scanning apparatus of an electrophotographic color printer, at least two beam deflectors, each having a deflection disk consisting of at least two sectors and a driving source for rotating the deflection disk, deflect and scan an incident beam. The deflection disk has a pattern formed thereon for diffracting and scanning the incident beam. A plurality of light sources, arranged between the beam deflector and a photoreceptor, emit light to the deflection disk. A beam path changing unit changes a proceeding path of the beam deflected by the respective beam deflectors to proceed toward the photoreceptor. A beam correcting unit, arranged between the respective beam deflectors and the photoreceptor, corrects the input beam having its path changed by the beam path changing unit.

10 Claims, 5 Drawing Sheets

BEAM SCANNING APPARATUS FOR ELECTROPHOTOGRAPHIC COLOR PRINTER USING DEFLECTION DISK

BACKGROUND OF THE INVENTION

1. Field of the Invention

The present invention relates to a beam scanning apparatus of an electrophotographic color printer.

2. Description of the Related Art

FIG. 1 shows a general electrophotographic color printer. Referring to the drawing, an electrophotographic color printer includes a photoreceptor such as a photoreceptor belt 1, a beam scanning apparatus 30 for forming an electrostatic latent image by exposing the photoreceptor belt 1 to light, and developing units 21, 22, 23, and 24 for developing the electrostatic latent image.

The photoreceptor belt 1 circulates around guide rollers 3. The electrostatic latent image remaining on the photoreceptor belt 1 is removed by a reset unit 2. An image record surface of the photoreceptor belt 1 is exposed to the beam emitted from the beam scanning apparatus 30.

The respective developing units 21–24 develop images of different colors, e.g., yellow, magenta, cyan, and black. The beam scanning apparatuses 30 are positioned at the upstream side of each of the respective developing units 21–24 and develop the electrostatic latent image by colors. The developed image is dried by a drying unit 8 and then transferred via a transfer roller 9 to a paper 10 passing between the transfer roller 9 and a fusing roller 11.

FIG. 2 shows a conventional beam scanning apparatus which is adopted in the above electrophotographic color printer to expose the photoreceptor to light. Referring to the figure, the conventional beam scanning apparatus 30 includes a light source 31, a beam deflector 34 for deflecting light emitted from the light source 31, and an f–θ lens 37 for correcting an error of the light deflected by the beam deflector 34.

Also, a focusing lens 33 for focusing the divergent beam emitted from the light source 31 is provided between the light source 31 and the beam deflector 34. A mirror 38 for changing a direction of a path of light is provided between the beam deflector 34 and the photoreceptor (not shown). Here, the focusing lens 33 determines the size of an optical spot formed on the photoreceptor.

The beam deflector 34 includes a motor 35 and a rotary polygonal mirror 36 which is rotated by the motor 35. The beam input to the beam deflector 34 is deflected according to an angle made between a reflection surface of the rotary polygonal mirror 36 and the input beam.

In the beam scanning apparatus 30 having the above structure, the photoreceptor is exposed to light by a main scanning by the beam deflector 34 and a sub-scanning by the movement of the photoreceptor perpendicular to the direction of the main scanning.

However, the structure of the beam scanning apparatus 30 which includes the rotary polygonal mirror 36 and the motor 35 is complicated. Further, in case of a color printer, the beam scanning apparatus 30 must be provided for each color to form a color image, thereby increasing the size of the apparatus. Also, the position of the deflected beam is affected by the wobble generated during rotation of the rotary polygonal mirror 36.

SUMMARY OF THE INVENTION

To solve the above problems, it is an objective of the present invention to provide a beam scanning apparatus of an electrophotographic color printer having a simplified structure by adopting a deflection disk as a deflecting means.

Accordingly, to achieve the above objective, there is provided a beam scanning apparatus of an electrophotographic color printer including at least two beam deflectors for deflecting and scanning an incident beam, each having a deflection disk consisting of at least two sectors and a driving source for rotating the deflection disk, the deflection disk having a pattern formed thereon for diffracting and scanning the incident beam; a plurality of light sources arranged between the beam deflector and a photoreceptor for emitting light to the deflection disk; a beam path changing means for changing a proceeding path of the beam deflected by the respective beam deflectors to proceed toward the photoreceptor; and a beam correcting means, arranged between the respective beam deflectors and the photoreceptor, for correcting the input beam having its path changed by the beam path changing means.

It is preferable in the present invention that the light sources are comprised of four light sources arranged parallel to each other and that the beam deflectors are comprised of four beam deflectors arranged parallel to each other for deflecting and scanning the light emitted from each light source.

Also, it is preferable in the present invention that the beam path changing means is comprised of a plurality of mirrors for reflecting the beam diffracted by and transmitted through the deflection disk toward the beam correcting means, and that the plurality of mirrors includes a first mirror installed under the deflection disk for reflecting the beam transmitted through the deflection disk, and a second mirror installed by the side of the deflection disk for reflecting the beam reflected by the first mirror toward the beam correcting means.

According to another aspect of the present invention, the light sources are comprised of first through fourth light sources arranged parallel to each other, and the beam deflectors includes a first deflector for deflecting and scanning the beams emitted from the first and second light sources, and a second deflector for deflecting and scanning the beams emitted from the third and fourth light sources.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 3:
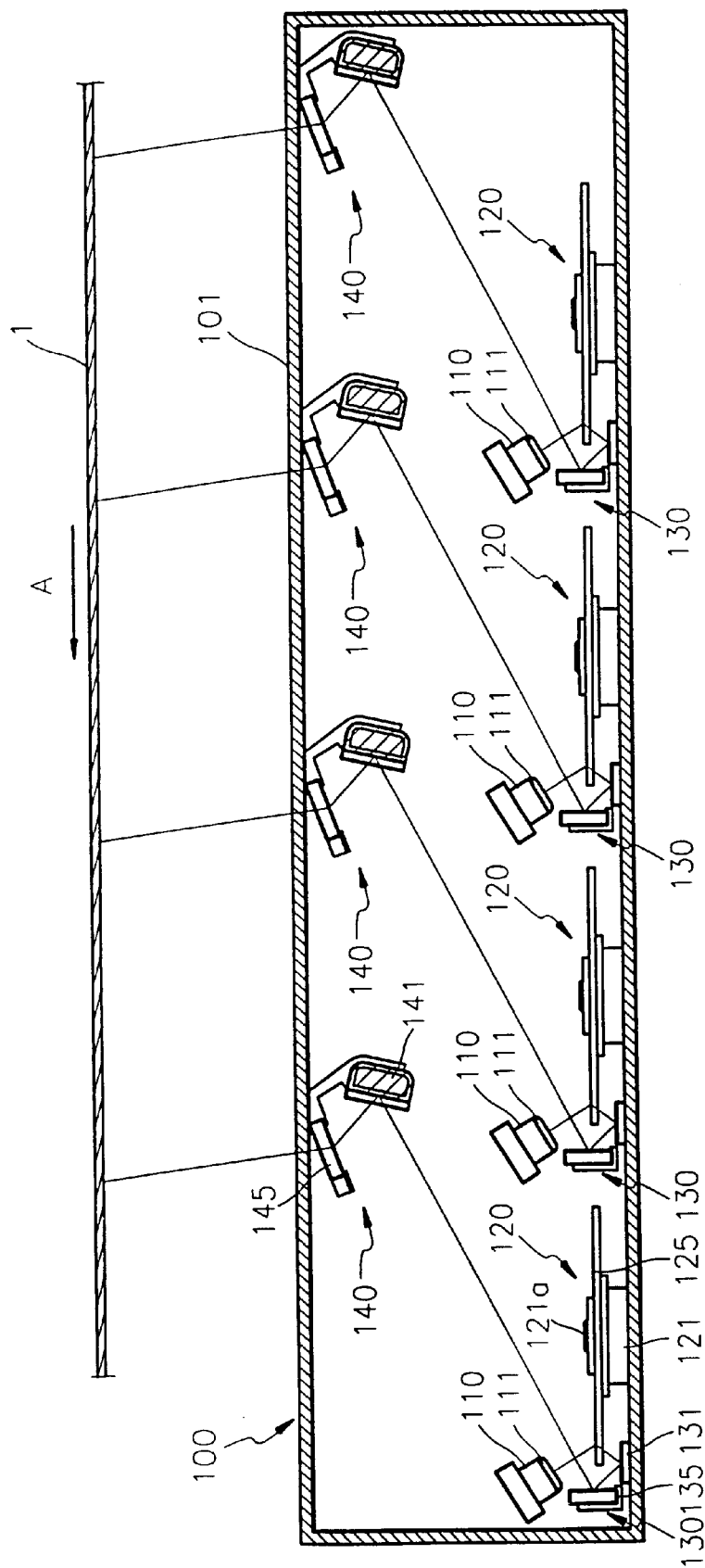
FIG. 3 is a view illustrating a beam scanning apparatus of an electrophotographic color printer according to a preferred embodiment of the present invention.

Referring to FIG. 3, a beam scanning apparatus 100 according to a preferred embodiment of the present invention includes light sources 110, beam deflectors 120 for deflecting and scanning an incident beam, beam path changing means 130 for changing a proceeding path of the beam deflected and scanned by the beam deflector 120, and beam correcting means 140 for correcting the incident beam.

The beam scanning apparatus 100, shown in FIG. 3, selectively scans beams emitted from four light sources 110 which are installed inside a frame 101 onto a photoreceptor 1, such as a photoreceptor belt, to form a color image.

The beam deflector 120 includes a driving motor 121 for supplying a rotational force, and a deflection disk 125 installed on a rotation shaft 121a of the driving motor 121 for diffracting and transmitting the incident beam. Here, the driving motors 121 are selectively driven.

Figure 4:
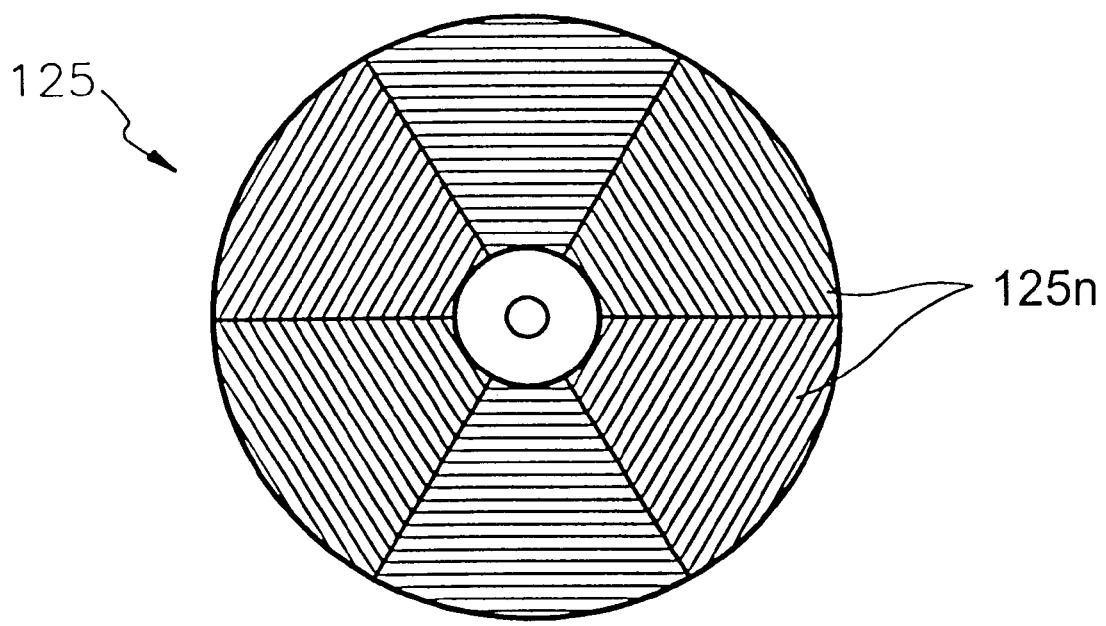
FIG. 4 is a plan view of the deflection disk of FIG. 3.

The deflection disk 125 is composed of at least two equally divided sectors 125n and, in a preferred embodiment of the present invention as shown in FIG. 4, the deflection disk 125 has six sectors 125n. Each of the sectors 125n has a pattern for diffracting and transmitting an incident beam and deflecting and scanning the same by a unit of one scanning line according to the rotation of the deflection disk 125.

Light emitted from the light source 110 is converted to a parallel beam by a collimating lens 111 and then falls on the deflection disk 125.

The beam path changing means 130 changes a proceeding path of the light deflected and scanned by the beam deflector 120, and is composed of first and second mirrors 131 and 135 as shown in the figure.

The light emitted from the light source 110 and then diffracted and transmitted by the deflection disk 125 is reflected by the first mirror 131 installed under the deflection disk 125, and the reflected light is reflected again by the second mirror 135 installed near to one side of the deflection disk 125 so that the beam is input into the beam correcting means 140.

According to the characteristic feature of the present invention, by adopting the beam path changing means shown in FIG. 3, the light source 110 can be installed near a position where the light transmitted through the deflection disk 125 is to be scanned, i.e., by the side of the photoreceptor 1, thus increasing usability of space.

The beam correcting means 140, arranged between the beam deflector 120 and the photoreceptor 1, corrects aberration of the beam whose path is changed by the beam path changing means 130 and shapes the beam. The beam correcting means 140 includes a reflection member 141 for focusing and reflecting an incident beam onto a hologram element 145 for diffracting and transmitting the beam reflected by the reflection member 141.

The reflection member 141 is preferably a curved mirror adapted to focus the parallel beam. The hologram element 145 allows the beam reflected by the reflection member 141 to proceed toward the photoreceptor 1 by diffracting and transmitting in a sub-scanning direction of the photoreceptor 1, i.e., in a direction roughly perpendicular to a proceeding direction A of the photoreceptor 1.

Figure 2:
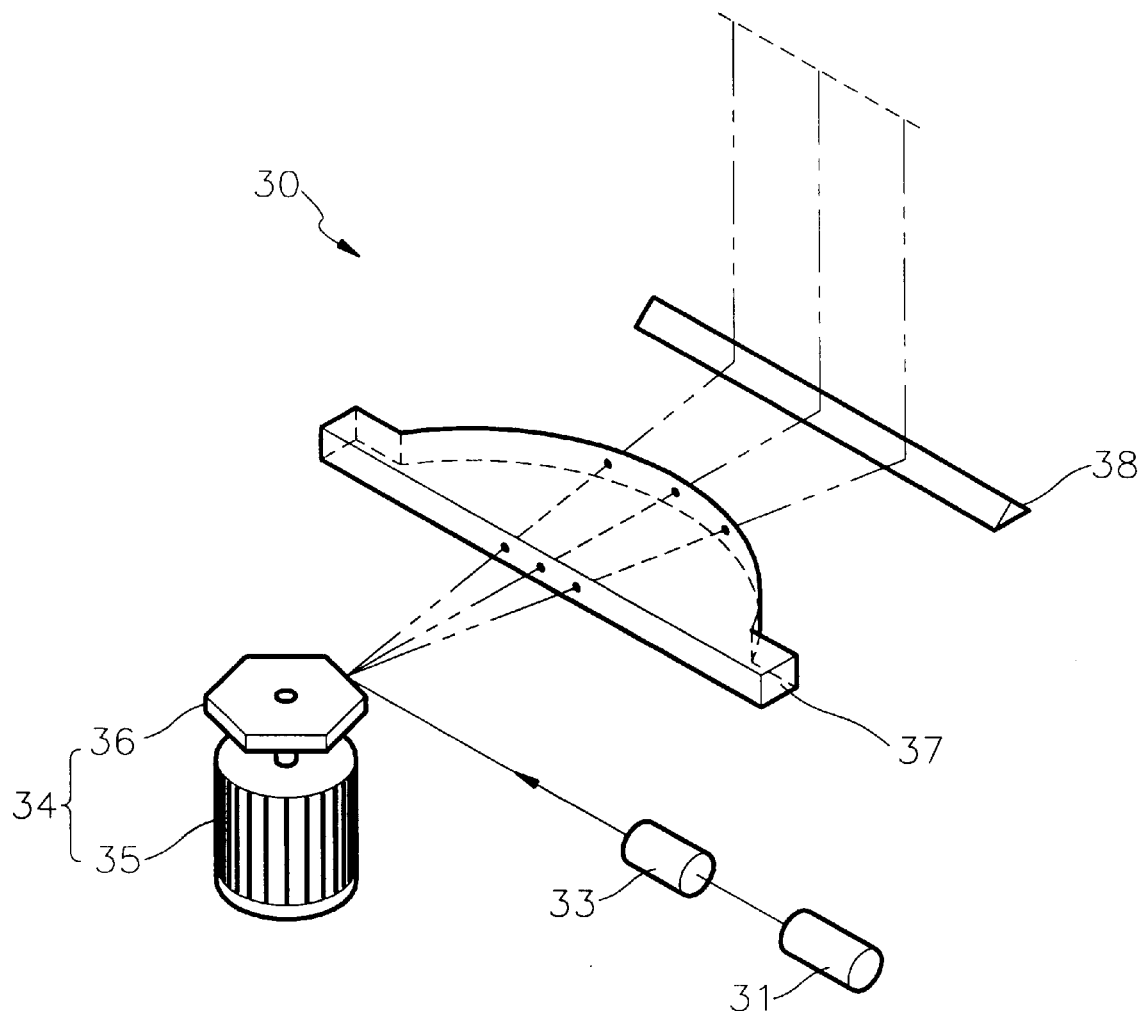
FIG. 2 is a perspective view illustrating the beam scanning apparatus of an electrophotographic color printer according to the conventional technology.

Alternatively, the beam correcting means 140 can include an f–θ lens (see 37 of FIG. 2).

In the beam scanning apparatus according to the present invention, the beams emitted from the four light sources 110 form electrostatic latent images on the photoreceptor 1 corresponding to each color of yellow, magenta, cyan, and black as described above with reference to FIG. 1.

Figure 1:
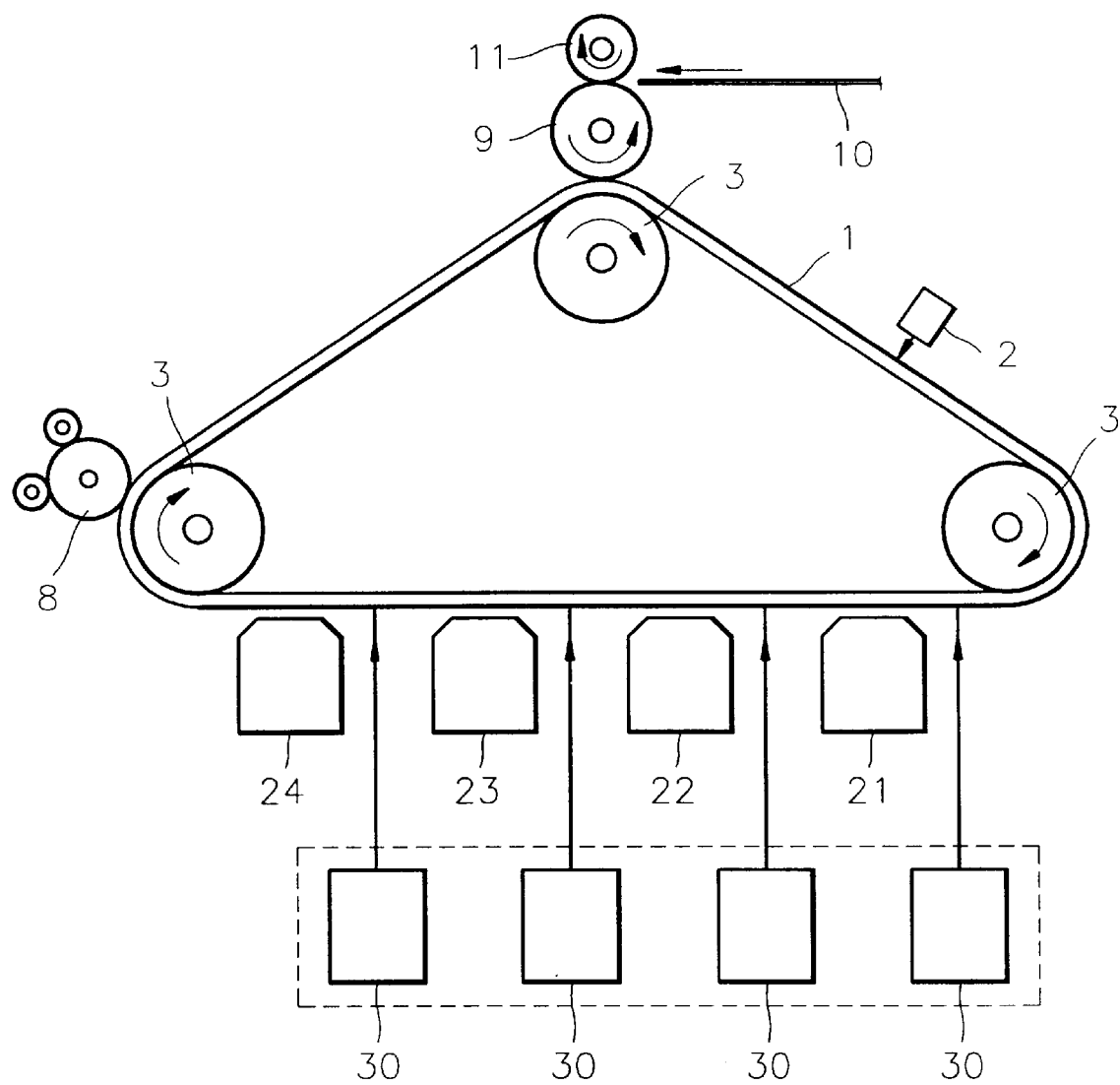
FIG. 1 is a view schematically showing the general electrophotographic color printer.
Figure 5:
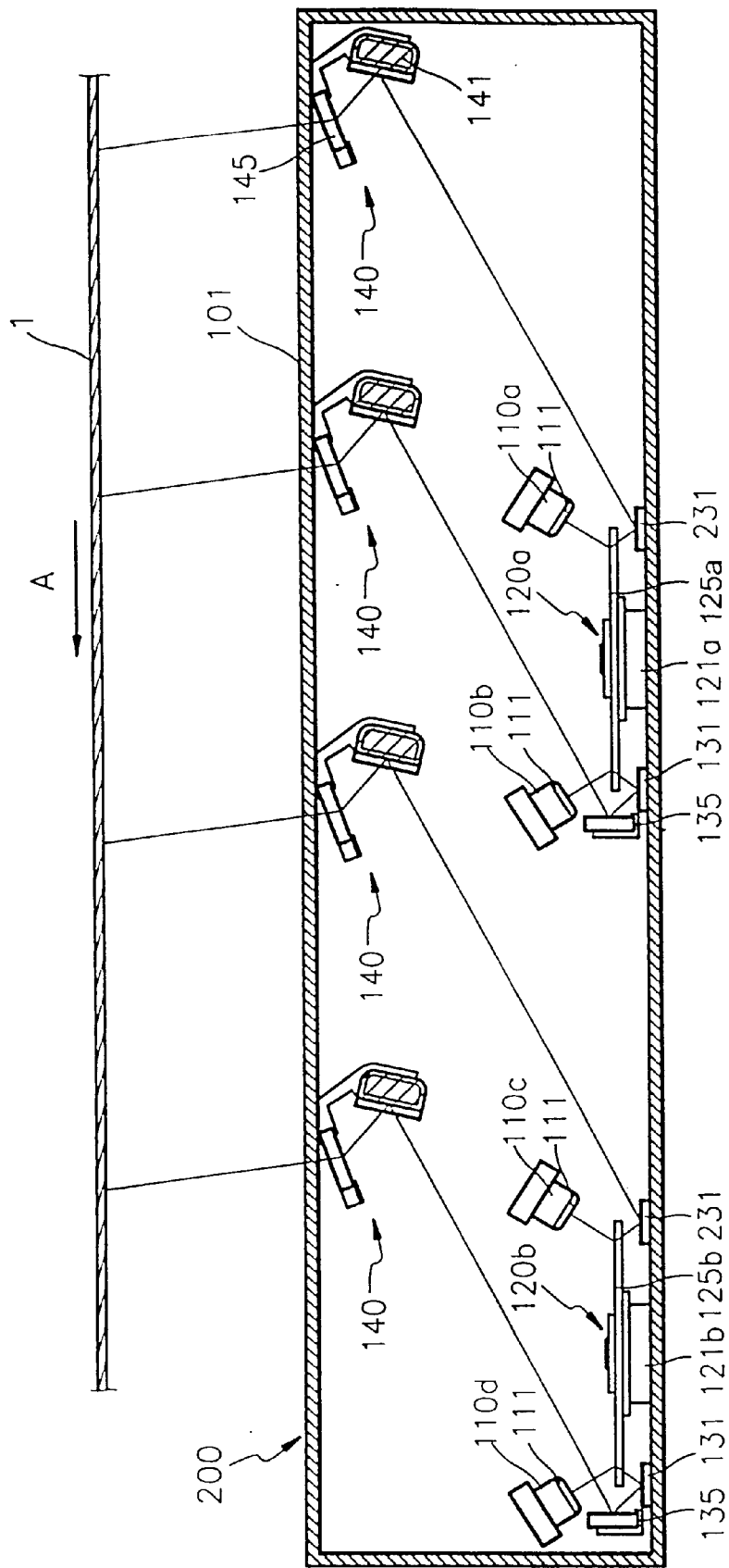
FIG. 5 is a view illustrating a beam scanning apparatus of an electrophotographic color printer according to another preferred embodiment of the present invention.

FIG. 5 shows a beam scanning apparatus of an electrophotographic color printer according to another preferred embodiment of the present invention. Here, the same reference numerals as in FIGS. 1 and 3 represent the same elements.

Referring to FIG. 5, a beam scanning apparatus 200 according to the present embodiment includes four light sources 110a, 110b, 110c, and 110d, first and second beam deflectors 120a and 120b for deflecting and scanning an incident beam, a beam path changing means for changing a proceeding path of the beam deflected and scanned by the first and second beam deflectors 120a and 120b, and a beam correcting means 140 for correcting the incident beam.

The first through fourth light sources 110a–110d are semiconductor lasers which generate and emit laser beams. The light sources 110a–110d are selectively driven to form electrostatic latent color images on the photoreceptor 1. The light emitted from the light sources 110a–110d each are converted to parallel beams by the collimating lenses 111.

The first and second beam deflectors 120a and 120b include driving motors 121a and 121b and deflection disks 125a and 125b.

According to the present embodiment, beams emitted from at least two light sources concurrently fall on the deflection disks 125a and 125b. That is, the beams emitted from the first and second light sources 110a and 110b fall on the first deflection disk 125a while the beams emitted from the third and fourth light sources 110c and 110d fall on the second deflection disk 125b.

Here, the beams emitted from the first and second light sources 110a and 110b fall on different sectors (refer to 125n of FIG. 4) of the first deflection disk 125a while the beams emitted from the third and fourth light sources 110c and 110d fall on different sectors of the second deflection disk 125b. Preferably, the beams fall on the opposite sectors with respect to the rotation shaft of each deflection disk.

The beam path changing means allow the beams emitted from the first and second light sources 110a and 110b, and the third and fourth light sources 110c and 110d, and deflected by the first and second deflectors 120a and 120b to proceed toward the beam correcting means 140 roughly parallel to each other. To do so, the beam path changing means includes a mirror 231 installed under the deflection disks 125a and 125b for reflecting the light emitted from the first and third light sources 110a and 110c and diffracted by and transmitted through the deflection disks 125a and 125b. Also, the beam path changing means includes a first mirror 131 installed under the deflection disks 125a and 125b for reflecting the light emitted from the second and fourth light sources 110b and 110d and diffracted by and transmitted through the deflection disks 125a and 125b, and a second mirror 135 installed at one side of the deflection disks 125a and 125b for reflecting the light reflected from the first mirror 131.

The four beams whose paths are changed by the beam path changing means proceed roughly parallel to each other toward their respective beam correcting means 140.

As described above, in the beam scanning apparatus of an electrophotographic color printer according to the present invention, by adopting the deflection disk which diffracts and transmits an incident light and the beam path changing means, the light source can be installed near the photoreceptor to which the beam is scanned, i.e., between the deflection disk and the photoreceptor, thereby increasing usability of space and making the structure of the apparatus compact.

Also, since the beams emitted from two light sources is diffracted and deflected by a single deflection disk, the number of parts can be reduced. Further, in the beam scanning apparatus according to the present invention, since a deflection disk is adopted as the beam deflecting means, a deflected beam can be stably scanned compared to the conventional method using a rotary polygonal mirror.

What is claimed is:

1. A beam scanning apparatus for an electrophotographic color printer comprising:

at least two beam deflectors for deflecting and scanning respective incident beams, each of said at least two beam deflectors having a deflection disk consisting of at least two sectors and a driving source for rotating said deflection disk, said deflection disk having a pattern formed thereon for diffracting and scanning the respective incident beams;

a plurality of light sources, arranged between said beam deflectors and a photoreceptor, for emitting light to said respective deflection disks;

beam path changing means for changing respective proceeding paths of the beams deflected by said respective beam deflectors to proceed toward the photoreceptor; and beam correcting means, arranged between said respective beam deflectors and the photoreceptor, for correcting the respective beams having their paths changed by said beam path changing means.

2. The beam scanning apparatus as claimed in claim 1, wherein said light sources are comprised of four light sources arranged parallel to each other; and wherein said beam deflectors are comprised of four beam deflectors, corresponding to said four light sources and arranged parallel to each other for deflecting and scanning the light emitted from each of said respective light sources.

3. The beam scanning apparatus as claimed in claim 1, wherein said beam path changing means is comprised of a plurality of mirrors for reflecting the beams diffracted by and transmitted through said deflection disks toward said beam correcting means.

4. The beam scanning apparatus as claimed in claim 3, wherein said plurality of mirrors comprise:

a first mirror installed under each of said deflection disks for reflecting the respective beam transmitted therethrough; and a second mirror installed by a side of each of said deflection disks for reflecting the respective beam reflected by said first mirror toward said beam correcting means.

5. The beam scanning apparatus as claimed in claim 1, wherein said light sources are comprised of first through fourth light sources arranged parallel to each other, and said beam deflectors further comprise:

a first deflector for deflecting and scanning beams emitted from said first and second light sources; and a second deflector for deflecting and scanning beams emitted from said third and fourth light sources.

6. The beam scanning apparatus as claimed in claim 5, wherein the beams emitted from said first and second light sources fall on different sectors of a first deflection disk corresponding to said first deflector, and wherein the beams emitted from said third and fourth light sources fall on different sectors of a second deflection disk corresponding to said second deflector.

7. The beam scanning apparatus as claimed in claim 5, wherein said beam path changing means comprises:

a first mirror, installed under each of said first and second deflection disks, for reflecting beams emitted from said first and third light sources and transmitted through said first and second deflection disks, respectively; and second and third mirrors, installed under and by the side of each of said first and second deflection disks, respectively, for reflecting beams emitted from said second and fourth light sources and transmitted through said first and second deflection disks, respectively.

8. The beam scanning apparatus as claimed in claim 1, wherein said beam correcting means comprises:

a reflection member for each of said beam deflectors for focusing and reflecting the beam deflected by said corresponding beam deflector; and a hologram element for each of said reflection members for diffracting and transmitting the beam reflected by said corresponding reflection member.

9. A beam scanning apparatus for an electrophotographic color printer comprising:

at least two beam deflectors for deflecting and scanning respective incident beams, each of said at least two beam deflectors having a deflection disk consisting of at least two sectors and a driving source for rotating said deflection disk, said deflection disk having a pattern formed thereon for diffracting and scanning the respective incident beams;

a plurality of light sources, arranged between said beam deflectors and a photoreceptor, for emitting the respective incident beams onto said deflection disks;

a plurality of beam path changers corresponding to said plurality of light sources, wherein, for each of said plurality if light sources, said corresponding beam path changer changes a proceeding path of said respective incident beam, after being deflected by one of said beam deflectors, to proceed toward the photoreceptor; and a plurality of beam correcting devices corresponding to said plurality of light sources, and arranged between said beam deflectors and the photoreceptor, wherein, for each of said plurality if light sources, said corresponding beam correcting device corrects said incident beam after said incident beam's proceeding path is changed by said corresponding beam path changer.

10. A beam scanning apparatus for an electrophotographic color printer comprising:

a beam deflector for deflecting and scanning an incident beam, said beam deflector having a deflection disk consisting of at least two sectors and a driving source for rotating said deflection disk, said deflection disk having a pattern formed thereon for diffracting and scanning the incident beam;

a light source, arranged between said beam deflectors and a photoreceptor, for emitting the incident beam onto said deflection disk;

a beam path changer which changes a proceeding path of the beam, after being deflected from said beam deflector, to proceed toward the photoreceptor; and a beam correcting device, arranged between said beam deflector and the photoreceptor, which corrects the beam after the beam's proceeding path is changed by said beam path changer.

* * * * *